US007017084B2

(12) United States Patent  (10) Patent No.: US 7,017,084 B2
Ng et al.  (45) Date of Patent: Mar. 21, 2006

(54) TRACING METHOD AND APPARATUS FOR DISTRIBUTED ENVIRONMENTS

(75) Inventors: Chan Ng, San Jose, CA (US); Tuan Nguyen, San Jose, CA (US)

(73) Assignee: Network Appliance Inc.

( * ) Notice: Subject to any disclaimer, the term of this patent is extended or adjusted under 35 U.S.C. 154(b) by 519 days.

(21) Appl. No.: 10/238,388

(22) Filed: Sep. 9, 2002

(65) Prior Publication Data

US 2003/0061550 A1  Mar. 27, 2003

Related U.S. Application Data

(60) Provisional application No. 60/317,817, filed on Sep. 7, 2001.

(51) Int. Cl.
*G06F 11/00* (2006.01)
(52) U.S. Cl. ....................................................... 714/45
(58) Field of Classification Search ................ 714/45, 714/42, 43; 717/128
See application file for complete search history.

(56) References Cited

U.S. PATENT DOCUMENTS 6,016,558 A * 1/2000 Seong et al. ................... 714/45
6,813,731 B1 * 11/2004 Zahavi et al. ................ 714/45
2002/0129339 A1 * 9/2002 Callahan et al. ............ 717/127

* cited by examiner

*Primary Examiner*—Scott Baderman
(74) *Attorney, Agent, or Firm*—Wiesner and Associates; Leland Wiesner

(57) ABSTRACT

A method and apparatus in a distributed processing environment for tracing events includes receiving a request to trace an event on a local processor, acquiring a sequence identifier associated with the local processor that associates the event with a chronological sequence of events on the local processor, storing the sequence identifier and information about the event in a local event trace associated with the local processor, providing the sequence identifer and information about the event to a remote processor for storage in a remote event trace. Consolidating the event traces from multiple processors into a single chronological event trace includes accessing a local event trace having one or more local trace events associated with the local processor, identifying a trace event entry having a local sequence identifier and referencing a remote processor, accessing a remote event trace associated with the remote processor and having a remote trace event entry matching the local sequence identifier, comparing the remote trace event entry with the local sequence identifier and one or more local trace events in the local event trace, and inserting the remote trace event entry into the local event trace based upon the comparison.

17 Claims, 8 Drawing Sheets

TRACING METHOD AND APPARATUS FOR DISTRIBUTED ENVIRONMENTS

CROSS REFERENCE TO RELATED APPLICATIONS

This application claims priority to U.S. Provisional Application No. 60/317,817, filed Sep. 7, 2001 and titled "Method & Apparatus for Processing fiber Channel Frames at Wire Speed", which is incorporated herein by reference.

BACKGROUND OF THE INVENTION

A tracing system is an important tool used during development and contributes to the efficient testing and verification of hardware and software projects. In general, the tracing system records the behavior of the hardware or software implementation during a period of operation. The chronological event trace produced by the tracing system illustrates the control logic and data flow as an application or test is performed. In many tracing system, the event trace information captured while the tracing systems is operating is stored in a separate trace file for subsequent inspection and analysis.

Together the tracing systems and resulting event trace can be used in a variety of ways. For example, the tracing system can be used to identify "bugs" in hardware or software causing errors or system checks. The event trace provides clues for determining the cause of the errors and helps verify when error has been resolved.

In another application, the tracing system and event trace can be used to refine and improve an existing hardware and/or software design. The tracing system monitors an existing hardware and/or software implementation and generates a trace that is studied and analyzed to better understand the control logic and data flow. This helps confirm that the hardware and software systems operate as expected and gives insight to refining the design and improving performance.

Existing tracings systems on the market typically rely on a combination of hardware and software subsystems. Hardware generally has physical connections built into the system for reading, writing, or monitoring for tracing events. For example, a logic analyzer receives digital information from the bus of a device and converts the signals received into information that can be readily analyzed. The software portion of these tracing systems track a sequence of events generated while a software system is running. For example, the trace information generated from the software system shows instructions being processed by the system, the content of registers, cache information, and variable information used in the software system being traced or debugged.

Unfortunately, these existing tracing systems are inadequate in multiprocessor or distributed processing environments. Chronological information used to sequence information is not readily available as several processors are capturing events using different clocks or synchronization mechanisms. Even if the clocks on the various systems are initially synchronized, over time the clocks drift and the trace events may start to appear out of order or incorrect. Accordingly, lack of synchronization makes it difficult to combine trace events from multiple processors or sources in these distributed systems. Consequently, it is difficult to analyze and trouble-shoot operation of these distributed systems.

Without adequate tracing systems, it is difficult to create high speed and reliable distributed processing systems. For example, distributed storage controllers interoperating with fiber channel switches (FCS) and storage devices to store and retrieve data from storage area networks (SAN) cannot be rapidly developed. Distributed network controllers and processing systems are also difficult to develop and support.

SUMMARY OF THE INVENTION

One aspect of the present invention concerns a method of tracing events in a distributed processing environment. The method for tracing receives a request to trace an event on a local processor, acquires a sequence identifier associated with the local processor and capable of associating the event with a chronological sequence of events on the local processor, stores the sequence identifier and information about the event in a local event trace associated with the local processor, provides the sequence identifier and information about the event to a remote processor for storage in a remote event trace.

Another aspect of the present invention includes consolidating the event traces from two or more processors a single chronological event trace. This process includes accessing a local event trace having one or more local trace events associated with the local processor, identifying a trace event entry having a local sequence identifier and referencing a remote processor, accessing a remote event trace associated with the remote processor and having a remote trace event entry matching the local sequence identifier, comparing the remote trace event entry with the local sequence identifier and one or more local trace events in the local event trace, and inserting the remote trace event entry into the local event trace based upon the comparison.

The details of one or more embodiments of the invention are set forth in the accompanying drawings and the description below. Other features and advantages of the invention will become apparent from the description, the drawings, and the claims.

DETAILED DESCRIPTION

Aspects of the present invention provide a tracing facility for distributed storage controllers directing the storage and retrieval of information in a storage area network (SAN) environment. This tracing system and method is advantageous for at least one or more of the following reasons described herein. The tracing method and system produces a single consolidated trace of events presented in chronological order even though multiple distributed storage controllers are operated and traced in parallel. Having the consolidated trace of events makes it easier to debug operation of the storage controllers than otherwise possible using multiple individual event traces produced from the different storage controllers or processors. Implementations of the present invention are also more accurate as the chronological order of the consolidated trace does not depend on successfully synchronizing clocks on different storage controllers or the ability to use a single clock as a reference for multiple systems. Instead of relying on clocks and synchronization, implementations of the present invention utilize sequence identifiers (SIDs) operating as local semaphores. These SIDs are used to maintain the chronological order of events from a processor or execution threads using the same SID sequence. To combine event traces, SIDs from multiple processors or execution threads are analyzed and then consolidated in chronological order.

Figure 1:
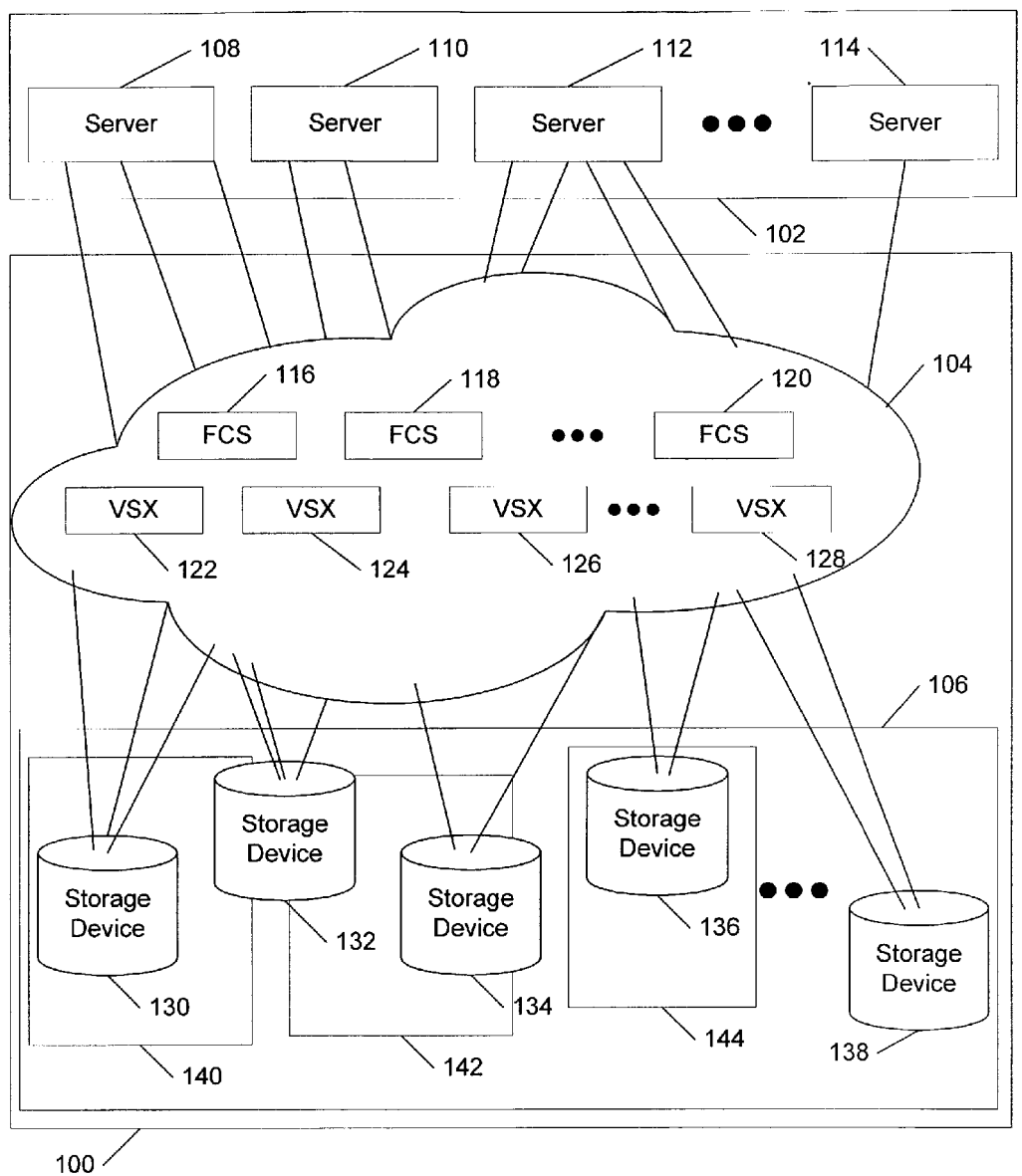
FIG. 1 is a block diagram of server devices and a storage area network (SAN) implemented using a fiber channel switching fabric using implementations of the present invention.

FIG. 1 is a block diagram of various server devices 102 and a storage area network 100 (SAN) implemented using a fiber channel switching fabric along with implementations of the present invention. Server devices 102 depicted in FIG. 1 access storage devices over SAN 100. SAN 100 provides a network infrastructure for the reliable access and rapid transportation of information even when server devices 102 may be more remotely located. The event tracing features of the present invention are embedded in a fabric 104 of SAN 100 and used to analyze control and data processed by distributed storage controllers in fabric 104.

Server devices 102 include server 108, server 110, and server 112 through server 114. These devices can be computer systems and devices attached to fabric 104 that utilize storage resources provided by storage devices 106. Ports on server devices 102 are designated "initiator ports" in SAN 100 as they are used to seek out and initiate communication with a target port. VSX devices 122, 124, and 126 through 128 appear as the "target ports" to ports on server devices 102.

Fiber channel switching (FCS) devices 116, and 118 through 120 provide switching functionality allowing components attached to and within fabric 104 to readily communicate with each other over one or more ports. VSX devices 122, 124, and 126 through 128 provide tracing capabilities to track traffic flowing over fabric 104 and presents consolidated trace information useful in analyzing and debugging operation of SAN 100. VSX devices 122, 124, and 126 through 128 are distributed storage controllers operating in parallel to direct traffic over fabric 104 yet use implementations of the present invention present to consolidate the tracing information in chronological order.

In the example implementation in FIG. 1, storage devices 106 depicted by storage device 130, 132, 134, and 136 through 138 include a combination of one or more storage device technologies including redundant array of independent/inexpensive disks (RAID), just a bunch of disks (JBOD), tape and other storage mediums. Storage devices in the SAN are sometimes referred to as SAN storage.

These various storage devices and technologies can be grouped together in "Storage pools" based on upon shared traits, performance characteristics, reliability, allocation policies, and quality of service (QOS). Virtualization allows the storage devices in these storage pools to be combined together and made accessible over fabric 104 as virtual storage. Storage virtualization provides the illusion to server devices 102 they are accessing a single disk drive or storage area rather than a pool of heterogeneous storage devices.

Free pools represent the available storage from the storage pool before allocation. A system administrator or software agent divides the storage into logical portions when deciding how to partition the free pools into allocated pools of storage. For example, FIG. 1 illustrates a virtual logical unit (VLUN) 140 using storage device 130 and storage device 132 and a VLUN 142 using storage device 132 and storage device 134. Storage device 138 remains in the free pool in this example implementation. LUN 144 represents a native LUN that maps directly to storage device 136. Of course, many other combinations of VLUN and LUN can be created from storage devices 106 other than the organization illustrated in FIG. 1.

Server devices 102 allocate blocks of data from storage devices 106 using switching and data sharing functionality provided through fabric 104. These blocks of data can come from one VLUN or a combination of VLUNs and LUNs in an allocated pool of storage. Further, fabric 104 also includes a port zoning feature to control access to the ports associated with VLUNs and LUNS in storage devices 106 and the ports associated with servers in servers 102. While not typical, port zoning can also be used to control port access between like storage devices 106 or between like servers 102. For example, fabric 104 can be used to facilitate access between server 108 and server 110 as allowed by the port zoning feature.

Port zoning is of particular interest for controlling access between server devices 102 and storage devices 106 using VSX 122, VSX 124 and VSX 126 through VSX 128. This relationship is represented logically by the block diagram in FIG. 2 of server devices 202 and SAN 200. In this example, ports to server devices 202 and storage devices are partitioned using port zoning and configured to pass all data and control through VSX 222, VSX 224 and VSX 226 through VSX 228. Because of this arrangement, communication between any server devices 202 and storage devices passes through VSX devices and can be traced in accordance with implementations of the present invention.

Figure 2:
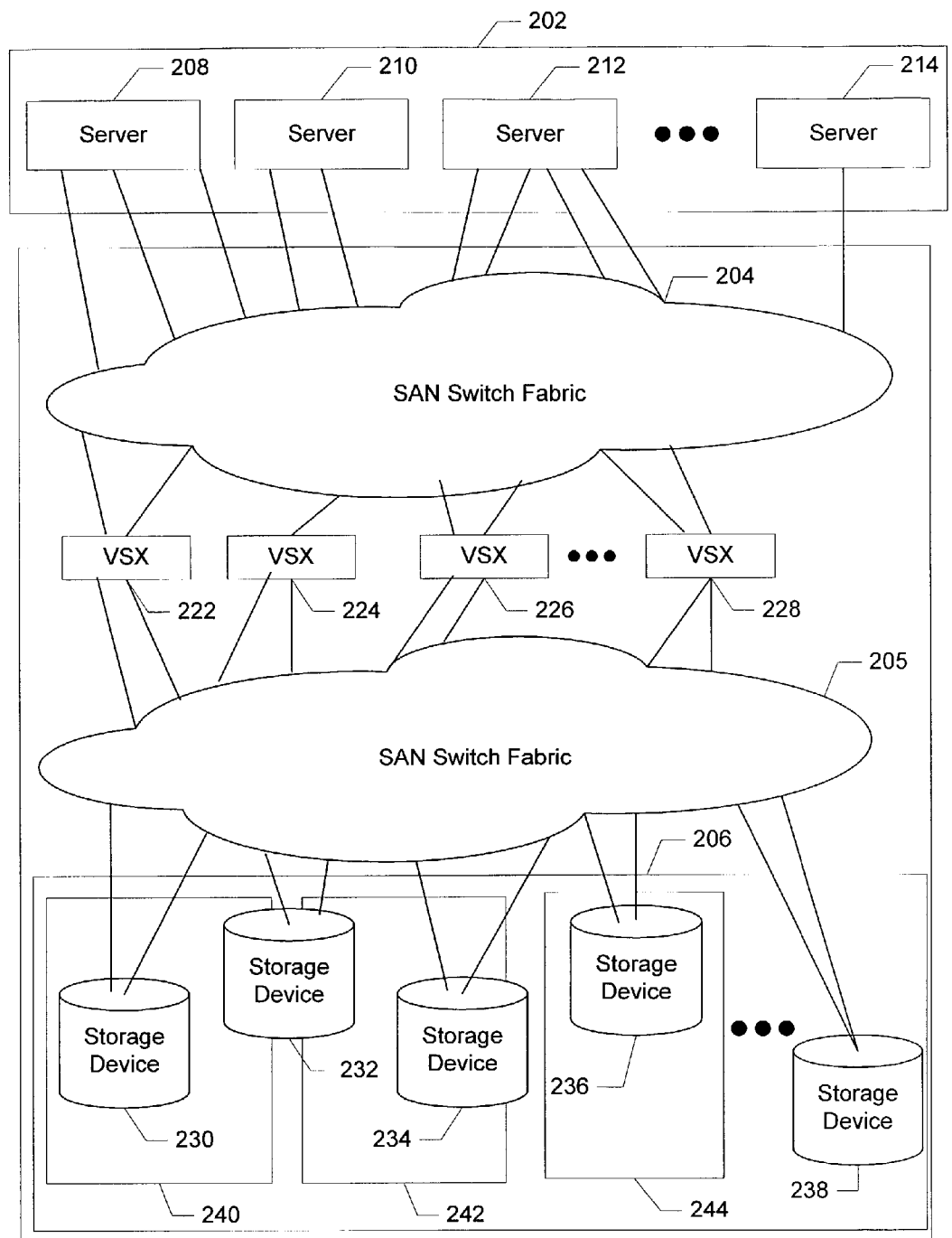
FIG. 2 is a block diagram depicting the logical relationship between server devices, storage devices, and target devices in accordance with one implementation of the present invention.

VSX devices in FIG. 2 appear as storage controllers to server device 208, server device 210, and server device 212 through server device 214. Each port on server device 208, server device 210, server device 212 through server device 214 acts as an initiator port. Corresponding ports on VSX 222, VSX 224 and VSX 226 through VSX 228 are target ports. Storage device 230, storage device 232, storage device 234 and storage device 236 through storage device 238 logically appear as VLUN 240, VLUN 242, and LUN 244. The logical gateway provided by the VSX devices between server devices 202 and storage devices separates SAN switch fabric 204 from SAN switch fabric 205 as they pass data through VSX 222, VSX 224 and VSX 226 through VSX 228.

Using SCSI protocol combatable taxonomy, the relationships portrayed in FIG. 2 are described using one or more Initiator-Target-LUN (ITL) triplets. As previously described, the combination is generally referred to as a port-storage identifier to describe the flow of information from the host servers to the storage devices. For example, a VSX exporting a LUN for a particular initiator-target pair creates an ITL binding and logical pathway between an initiating server device and the VLUN or LUN storage device. Fabric 204 and fabric 205 provide the switching necessary for arranging the port-storage identifiers among one or more ports on server devices, one or more ports on various VSX devices and one or more ports on LUNs or VLUNs and their underlying storage devices.

Figure 3:
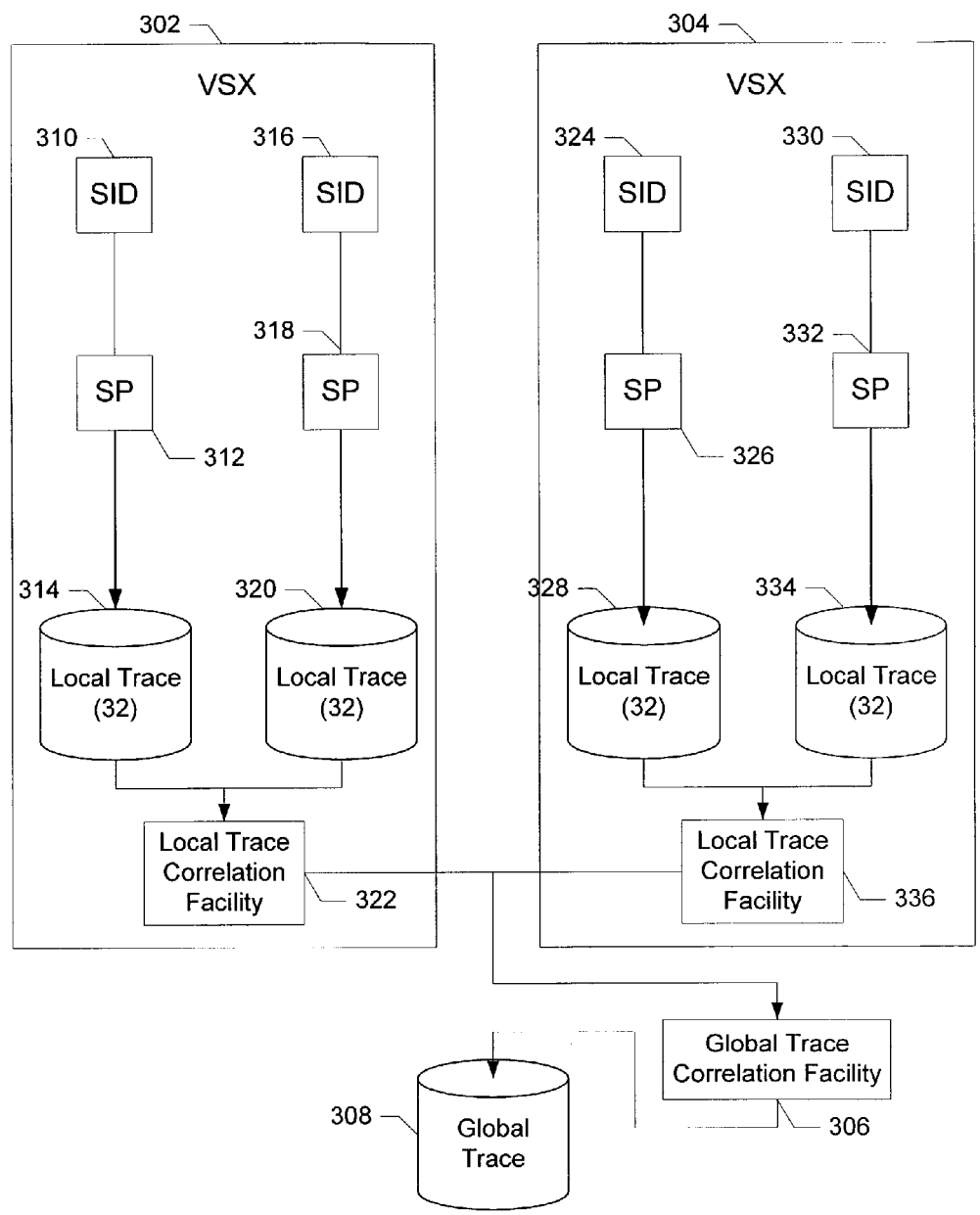
FIG. 3 is a block diagram highlighting portions of a storage controller used in performing a distributed event trace in accordance with one implementation of the present invention.

FIG. 3 is a block diagram highlighting portions of a storage controller used in performing a distributed trace in accordance with one implementation of the present invention. For clarity, the VSX devices and related components depicted in FIG. 3 illustrate relevant portions used to perform distributed tracing rather than all portions required to operate the VSX as a storage controller. Accordingly, this example configuration includes a VSX device 302 and a VSX device 304, a global trace correlation facility 306, and a global trace 308. While only two storage controllers each having two processors are illustrated, alternate implementations could include more than two storage controller devices with more than two processors operating in accordance with the present invention as described in further detail later herein.

In this implementation, VSX device 302 and VSX device 304 perform storage controller functions in a loosely coupled parallel processing arrangement. Global trace correlation facility 306 correlates event traces from the distributed and loosely coupled storage controllers as they control data storage and retrieval on the SAN. The resulting correlation produces a chronological sequence of events in response to executing functional code on the distributed arrangement of storage controllers. For example, functional code can be a program accessing SAN storage through distributed storage controllers VSX device 302 and VSX device 304 and traced using this implementation of the present invention.

To accommodate this loosely coupled arrangement, implementations of the present invention do not require VSX device 302 and VSX device 304 to share a common clock or perform clock synchronization. Instead, independent sequence identifiers (SIDs) associated with VSX device 302 and VSX device 304 are used to facilitate this distributed event tracing functionality.

In addition to tracing events between storage controllers, implementations of the present invention can also trace events being processed on loosely coupled distributed processors within a storage controller. Referring to FIG. 3, VSX 302 includes sequence identifier (SID) 310, sequence identifier (SID) 316, storage processor (SP) 312, storage processor (SP) 318, local trace 320, and local trace 314. The output produced by these components described above is provided to local trace correlation facility 322 for further processing and consolidation into a chronologically accurate event trace sequence.

In operation, SP 312 and SP 318 processors are sequencing trace events in parallel using SID 310 and SID 316. Each SID is associated with one of the illustrated processors and keeps track of events occurring on the processor in chronological order. SP 312 and SP 318 store trace events in local trace 314 and local trace 320 respectively in accordance with implementations of the present invention. Implementations of the present invention are subsequently used to consolidate trace events stored in multiple event traces and stored in parallel as SP 312 and SP 318 are executing. Using the SID value and information on the processors, trace events in local trace 314 can be merged with trace events in local trace 320 while maintaining chronological order.

Within each processor, there can be many threaded execution units or picoprocessors sharing a common SID sequence. These execution units perform tightly coupled parallel processing of instructions on behalf of the storage controller. In addition to sharing an SID sequence, they also may share a common clock for timing purposes. For example, SP 312 can be implemented using a processor having 32 picoprocessors each executing instructions in a tightly coupled parallel processing arrangement. Each picoprocessor in SP 312 increments SID 310 and uses the value in SID 310 exclusively for each event to keep an accurate sequence of events performed by one or more of the picoprocessors. The event description and corresponding value in SID 310 is stored in local trace 314 for subsequent analysis.

In a similar manner to that described above, VSX 304 uses SP 326 and SP 332 to also process information in a loosely coupled and distributed parallel processing arrangement. Event tracing information and output from SID 324 and SID 330 are stored in local trace 328 and local trace 334. In one implementation, SP 326 and SP 332 are also implemented using a processor having 32 picoprocessors each executing instructions in a tightly coupled parallel processing arrangement.

Figure 4:
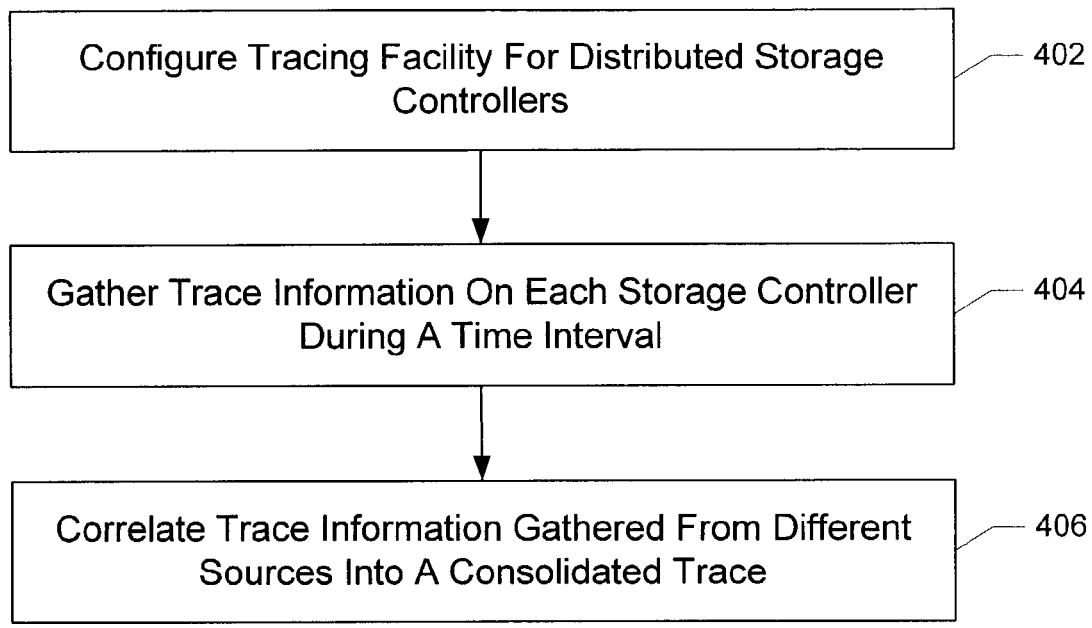
FIG. 4 is a flow chart diagram providing the overall operations associated with tracing events in a distributed storage controller environment.

FIG. 4 is a flow chart diagram providing the overall operations associated with tracing events in a distributed processing environment. Specifically, this diagram applies to a distributed storage controller for processing control and data on a SAN, however it could also be used in other distribute processing applications.

Initially, a tracing facility for distributed storage controllers is configured in accordance with the present invention (402). The configuration information includes loading applications for execution, defining the content of information to be included in the trace, the frequency of the trace, the types of traces to perform, and any other information for configuring the system. Once configured, trace information is gathered as each storage controller operates in parallel during a time interval (404). Applications use the distributed storage controllers configuration to perform operations more quickly, efficiently, and reliably. For example, an application can read information from one SAN storage area while writing information to another SAN storage area by performing these functions in parallel over the storage controllers. Also, an application can also read information from a first storage controller and then continue to read the information from another storage controller if the first storage controller runs out of resources or fails to operate. As these or other operations are performed, implementations of the present invention gather and store appropriate trace information and sequencing associated with the SIDs.

Using the collected event trace information, implementations of the present invention correlate the trace information from the different sources into a consolidated (406). Because many different event traces can be consolidated, the type of event trace often depends on the trace information needed. For example, a trace for a processor using a single SID can be used immediately as the trace events are stored in chronological order as they occur. Alternatively, the local trace information from multiple processors and event traces on a storage controller can also be combined. Further, a global trace can also be created that combines trace information from multiple storage controllers and the corresponding local traces associated with multiple processors contained within the storage controllers. Each of these and other traces can be created using implementations of the present invention.

Figure 5:
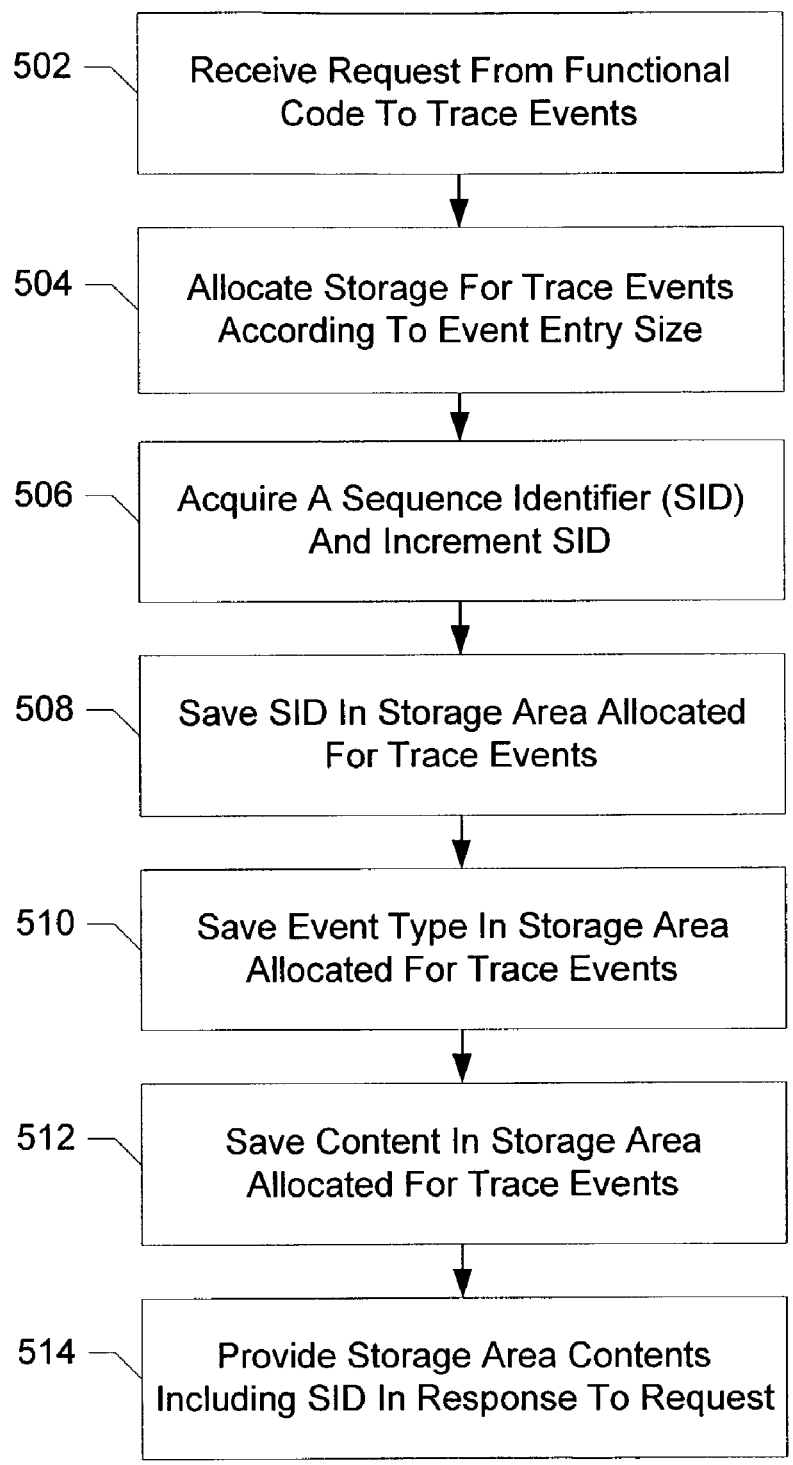
FIG. 5 is a flow chart diagram depicting the operations associated with consolidating tracing events generated on a distributed processing network in accordance with one implementation of the present invention.

FIG. 5 is a flow chart diagram depicting the operations associated with generating tracing events on a distributed processing network in accordance with in accordance with one implementation of the present invention. Functional code being processed by various distributed storage controllers generally requests tracing and tracking events locally (502). Functional code includes applications, routines, and code that exercises the features of the distributed storage controllers. For example, the functional code can be an application designed to test the storage controllers during quality assurance or can be an actual product being debugged that accesses SAN storage through the distributed storage controllers. In alternate implementations of the present invention, the functional code includes any code or codes that process information on a distributed processor system and requests accurate event tracing functionality.

To record the event trace, a storage area is allocated for storing trace events according to the size of event entries (504). In one implementation, the storage area is filled as events occur and may wrap around and overwrite existing events in the storage area until the tracing is stopped. For example, a triggering event designed to stop the tracing may not occur until the buffer has been filled and overwritten many times. If an error causes a triggering event to stop the tracing, the information in the storage area will reflect the contents of the buffer immediately preceding the occurrence of the error. This type of tracing is performed using a "Stop Trace" type of tracing. A "Start Trace" type of tracing is a different type of tracing that only begins filling the storage area with trace events when the triggering event occurs. Once the triggering event occurs in a "Start Trace" type of trace, the buffer begins filling with trace events until it is full. Storing the trace events ends when the buffer is full and illustrates the trace events immediately following the triggering event. Both a "Start Trace" and a "Stop Trace" type of trace require the appropriate amount of storage space to be allocated in order for the trace results to be meaningful for analysis.

Each trace event acquires a sequence identifier (SID) and increments the SID once after the SID has been recorded in the local event trace (506). In one implementation of the present invention, the SID operates as a semaphore for events occurring on each processor within a storage controller or VSX device. The SID identifies the sequence of the trace event as performed by the processor and is used by implementations of the present invention during the correlation and consolidation of trace information.

If a trace event occurs on a processor, the SID associated with the trace event on the processor is stored in the storage area or local trace (508). The SID associated with the processor provides a chronological sequence of events performed by the processor according to the SID sequence.

In addition to the SID, implementations of the present invention can also store the event type in the storage area or local trace (510). For example, the "command event" type could include that a read command, a write command, or an inquiry command is being requested. The event type could also include that the command is being "sent" to or "received from" another storage controller or processors being used in the distributed processing environment. Many other event types could also be included as needed by the tracing system and event trace being created.

Trace event information stored can also include and store content in the storage area or local trace (512). In one implementation of "message event", a portion of the message requests can be stored in the storage area or local trace as needed. This content could include the first portion of a message, the last portion of the message, the complete message, or various combinations thereof. Aside from the SID, much of the content and information stored in the local trace is requested by the functional code or the user or developer creating the functional code.

Eventually, each trace event including the SID and other information is provided as requested (514). In some cases, the trace event and information is only stored in a local trace. However, if the trace event is also associated with a remote processor, the SID along with functional code causing the event is passed to a remote processor where it is stored in a remote event trace. Of course from the remote processor's perspective, the SID and other information is stored in a local trace for the remote processor. The source and destination processor information is also useful for analysis and also may be stored in the local event trace. Having the same SID and related information in both the local trace for the local processor and the local trace associated with the remote processor is important in correlating the various trace entries and creating a consolidated trace.

Figure 6:
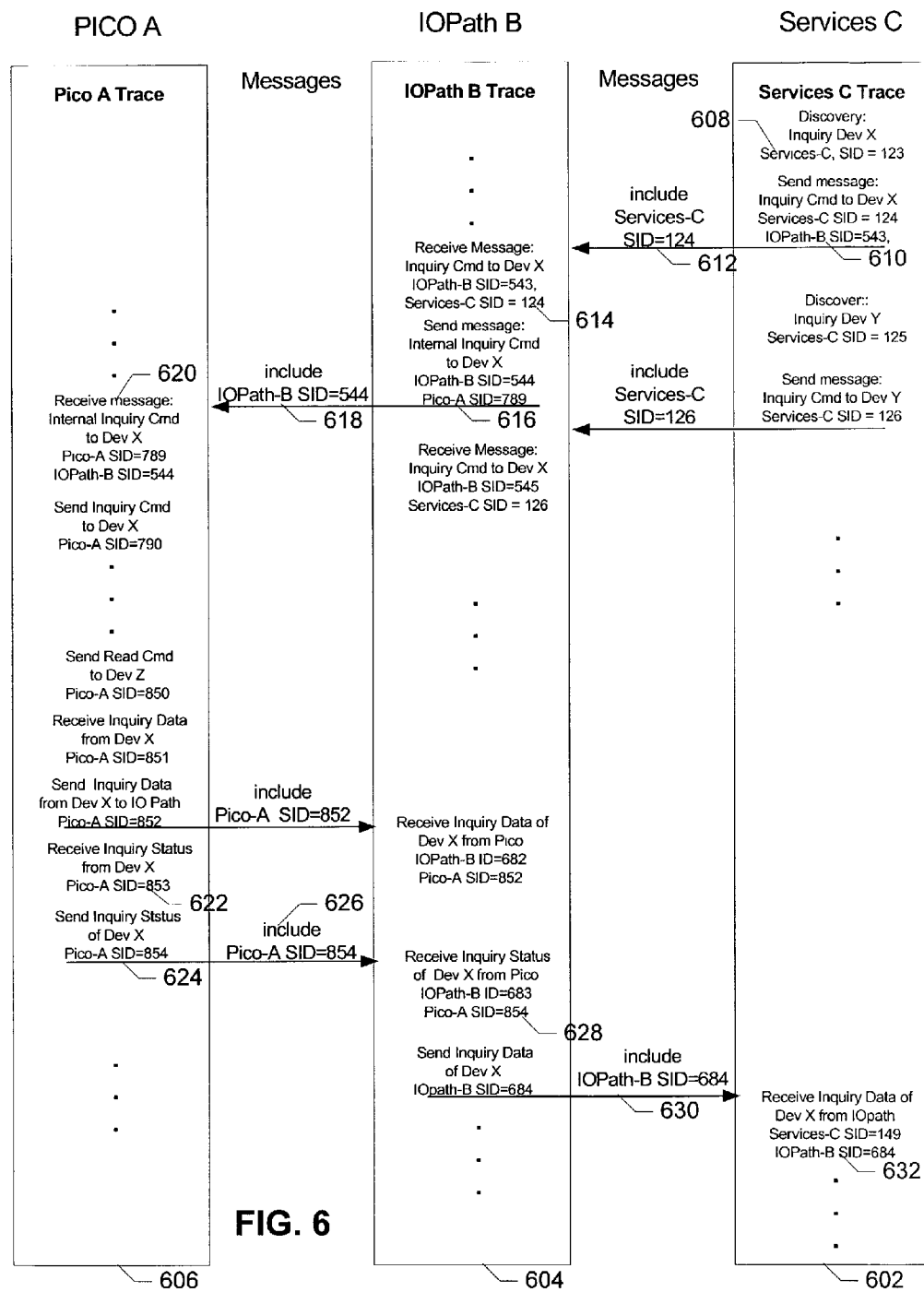
FIG. 6 is diagram of several event traces in a distributed storage controller system using sequence identifiers (SID) in accordance with one implementation of the present invention.

FIG. 6 is diagram of several local traces using sequence identifiers (SID) recording trace events in accordance with one implementation of the present invention. In this example, tracing is being performed as functional code is executing on multiple loosely coupled processors. In particular, the processors illustrated include PICO A, IOPATH B and SERVICES C as they store trace events in corresponding local trace 602, local trace 604, and local trace 606 respectively. Alternate implementations could include more processors and trace logs depending on the functional code and distributed processing required.

Each local trace reflects the trace events occurring on each local processor and, in some cases, events being traced as they are processed on remote processors. In this example, local trace 602 has trace event 608 with SID value "123" and indicates that a command is to be performed on a remote device "Dev X". In the subsequent trace event 610 in local trace 602, the SID is incremented and has an SID value of "124". Trace event 610 indicates that a message is being sent to a remote processor identified as "Dev X" and includes the SID of "124" from SERVICES C.

A communication event 612 passes the SID value of "124" and other information entered in local trace 602 to the remote processor identified as IOPATH B where it is stored as trace event 614 in local trace 604. The entry in local trace 604 includes the current SID of "543" associated with the IOPATH B processor (destination) as well as the SID of "124" identifying the SERVICES C processor (source). Together, the SID from the destination processor, the SID from the source processor along with the other information in the trace event facilitates identifying trace event 614 for correlation with other trace events and consolidation into a single trace in accordance with implementations of the present invention. Trace event 616 in local trace 604, communication event 618, and trace event 620 in local trace 606 indicate that the command for "Dev X" continues through several processors and eventual arrives at "Dev X" for actual processing.

Tracing the event entries for a fulfilled request for information or processing works similarly. Trace event 622 in local trace 606 indicates receipt of inquiry status from "Dev X" and includes the current SID of "853" for the PICO A processor SID. The SID value for the PICO A processor is then incremented to "854" and stored in the subsequent trace event 624 that sends the inquire status from PICO A to IOPATH B through a communication event 626. This process continues as trace event 628 records the receipt of inquiry status from PICO A processor and SID value of "854" and subsequently sends the actual inquire data from "Dev X" to the SERVICES C processor along with the incremented SID value of "684" over a communication event 630. Trace event 632 records the receipt of the inquiry data from "Dev X" and notes SERVICES C (destination) and SID of "149" combined with IOPATH B (source) and SID of "684".

Figure 7:
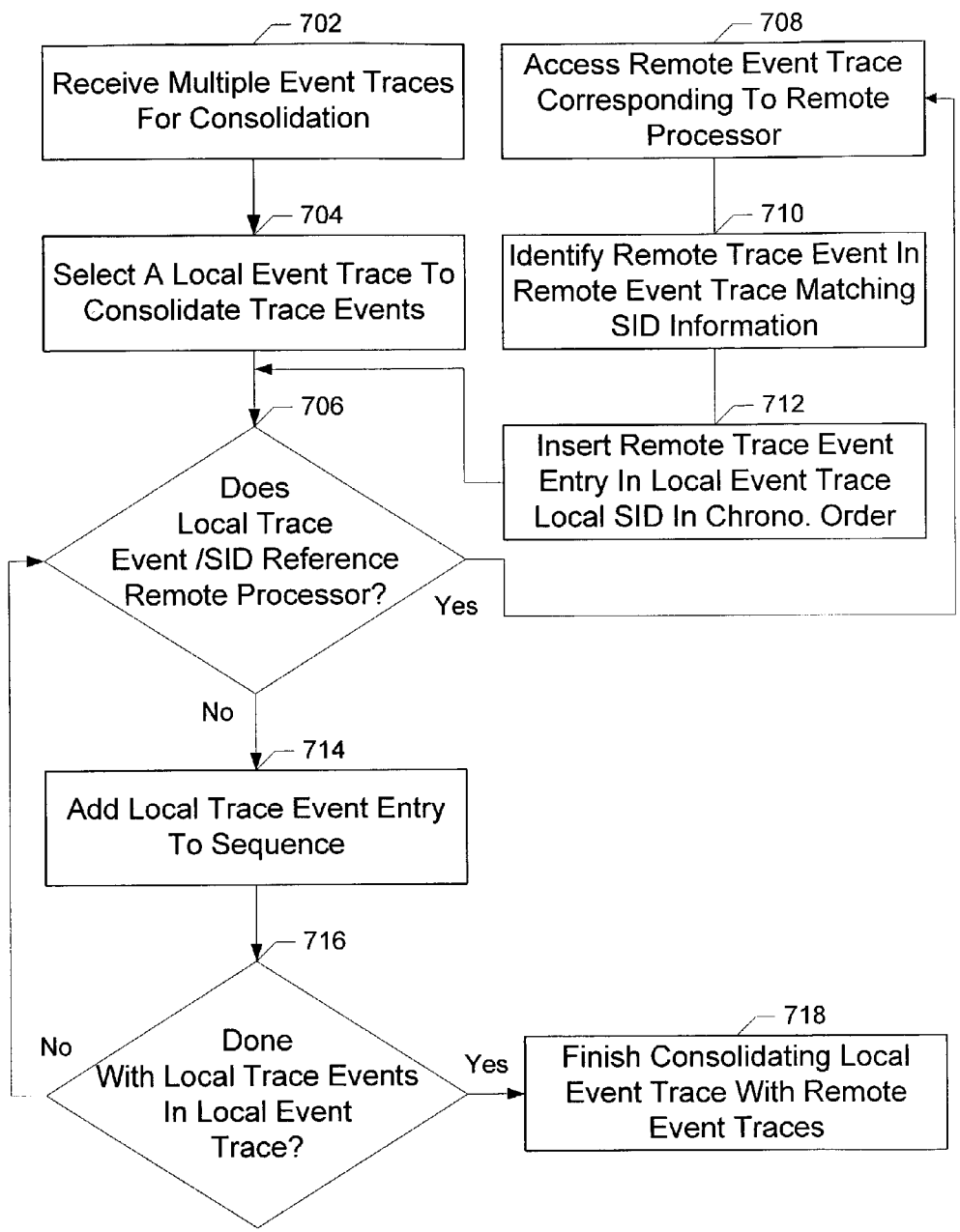
FIG. 7 is a flow chart diagram illustrating the operations associated with correlating creating a consolidated event trace in accordance with one implementation of the present invention.

FIG. 7 is a flow chart diagram illustration the operations associated with correlating trace entries and creating a consolidated event trace in accordance with one implementation of the present invention. Initially, multiple local event traces are received for consolidation into a single event trace (702). These event traces can be stored in a database or can be entries in a flat file organized with a regular syntax or structure. The user or consolidation operation identifies one of the local event traces to consolidate with other trace events (704). Each trace event in the local event trace is parsed and analyzed to determine if entries in other remote traces need to be accessed.

If the local trace has a trace event referencing a remote processor, the trace event is correlated with another entry in a different event trace (706). The local event trace corresponding to the remote processor is accessed if the entry indicates a remote processor (708). For example, in FIG. 6, the consolidation operation accesses the IOPATH B event trace because trace event 610 references IOPATH B as the remote processor designated to receive the inquiry command. Once the remote event trace is determined, the proper remote trace event matching the SID information is identified in the remote event trace (710). Each of the entries in the remote event trace is searched for the matching SID information and optionally the source and destination processor. The entry in the remote trace matching the SID and other information is inserted in the local event trace sequence in the appropriate chronological order (712). In FIG. 6, for example, trace event 614 identifying processor "Services-C" and SID "124" would be inserted subsequent to trace event 610 in event trace 602.

Alternatively, the local trace even entry is used immediately when the local trace does not reference a remote processor (714). The SID used by a single processor or by a thread group or picoprocessors is shared and therefore keeps each trace event inherently in chronological order. Once all the trace events in the local event trace have been processed, the local event trace and remote event trace are consolidated into one trace (718). As previously discussed, the consolidation operation can consolidate a variety of event traces including event traces for loosely coupled processors on a single storage controller and even traces from loosely coupled storage controllers.

Figure 8:
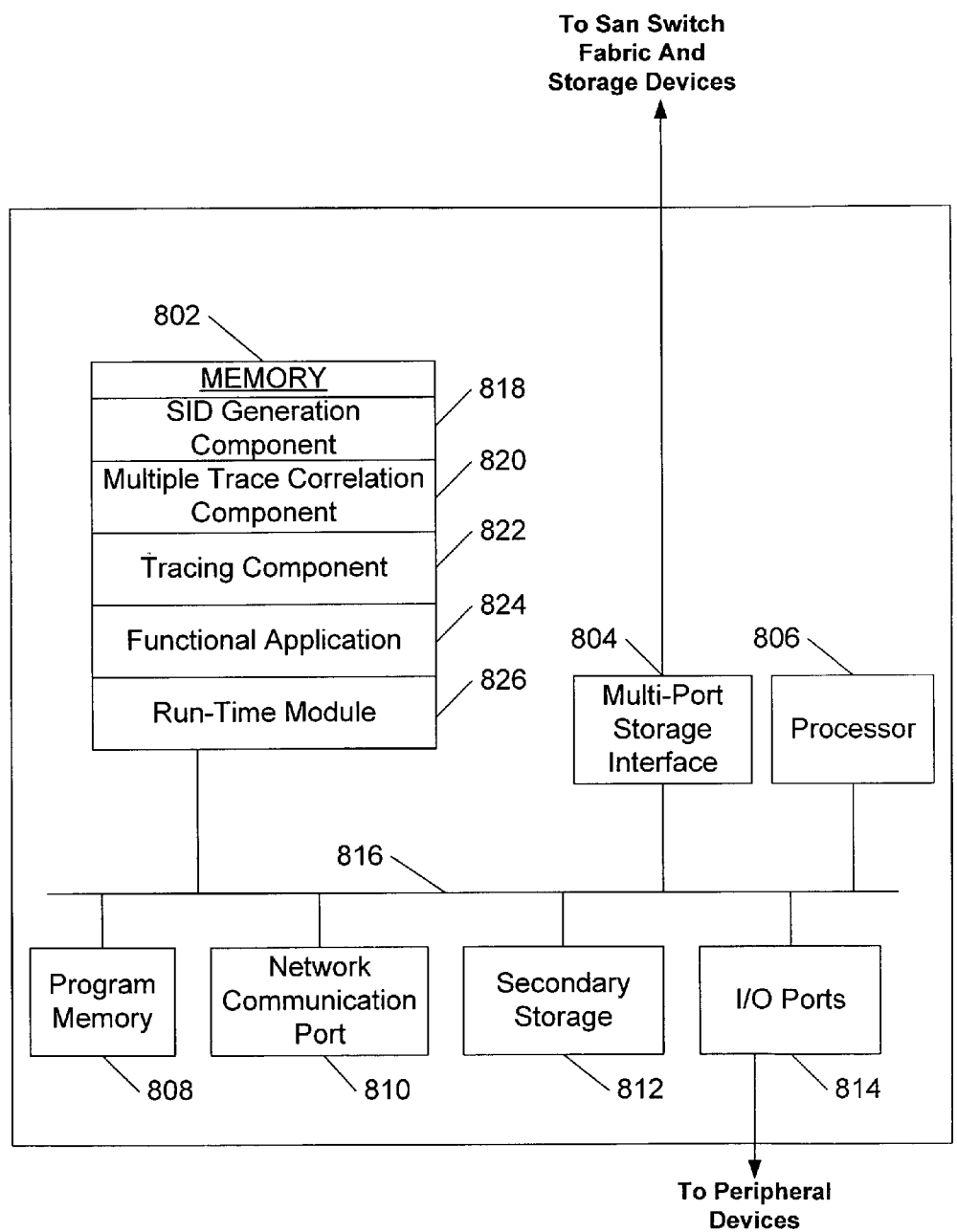
FIG. 8 provides one implementation of the present invention as it would be implemented in a computer device or system.

FIG. 8 provides one implementation of the present invention as it would be implemented in a computer device or system. In this example, system 800 includes a memory 802, typically random access memory (RAM), a multiport storage interface driver 804, a processor 806, a program memory 808 (for example, a programmable read-only memory (ROM) such as a flash ROM), a network communication port 810 as an alternate communication path, a secondary storage 812, and I/O ports 814 operatively coupled together over bus 816. The system 800 can be preprogrammed, in ROM, for example using a microcode or it can be programmed (and reprogrammed) by loading a program from another source (for example, from a floppy disk, a CD-ROM, or another computer) and preferably operates using real-time operating constraints.

Memory 802 includes various components useful in implementing aspects of the present invention. These components include a sequence identifier (SID) generation component 818, a multiple trace correlation component 820, a tracing component 822, and a functional application 824 managed using a run-time module 826.

Sequence identifier (SID) generation component 818 is associated with each processor in a storage controller and operates as a semaphore. The SID is incremented for each trace event and stored in a local event trace. Multiple trace correlation component 820 processes the event trace produced by multiple processors or storage controllers and combines them into a single event trace in accordance with the present invention. The SID information stored in the local traces is used to determine the chronological order of events given multiple traces. Tracing component 822 collects the trace event information and stores the information in the proper format in the event trace file and functional application 824 is an application that uses a storage network or SAN storage and causes trace events to be generated.

Secondary storage 812 is suitable for storing executable computer programs, including programs embodying the present invention, and data including buffers, cache space, and/or temporary storage space as needed to implement aspects of the present invention.

Input/output (I/O) ports 814 are coupled to system 800 through bus 816. Input/output ports 814 facilitate the receipt and transmission of data (e.g., text, images, videos, and animations) in analog or digital form over communication links such as a serial link, local area network, wireless link, and parallel link. These input/output (I/O) ports also facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 504.

In general, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, the processor receives instructions and data from a read-only memory and/or a random access memory. Also, a computer will include one or more secondary storage or mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described herein for purposes of illustration, various modifications may be made without departing from the spirit and scope of the invention. For example, implementations of the present invention are described as being used by SAN system using distributed storage controllers however it can also be also be used for tracing functionality on other distributed systems including distributed network controllers, distributed computing controllers, and other distributed computing products and environments. Accordingly, the invention is not limited to the above-described implementations, but instead is defined by the appended claims in light of their full scope of equivalents.

What is claimed is:

1. A method of tracing events in a distributed processing environment, comprising:
   receiving a request to trace an event on a local processor;
   acquiring a sequence identifier associated with the local processor and capable of associating the event with a chronological sequence of events on the local processor;
   storing the sequence identifier and information about the event in a local event trace associated with the local processor; and
   providing the sequence identifier and information about the event to a remote processor for storage in a remote event trace.

2. The method of claim 1 further comprising incrementing the sequence identifier for the local processor before providing the sequence identifier to another event being traced on the local processor.

3. The method of claim 1 wherein the event includes an error event.

4. The method of claim 1 wherein the request to trace is generated by a process executing functional code having instructions for performing one or more events.

5. The method of claim 4 wherein the process is executing functional code on the local processor.

6. The method of claim 4 wherein the process is executing the functional code on the remote processor.

7. The method of claim 1 further comprising:
   gathering content from information available on the local processors; and
   storing the content in storage associated with the local processor.

8. The method of claim 7 wherein the content includes an event code to identify the type of event.

9. The method of claim 7 wherein the content includes the information saved in a trace buffer.

10. A method of consolidating event traces from two or more processors into a single event trace providing a chronological order to a combined trace events, comprising:
    accessing a local event trace having one or more local trace events associated with the local processor;
    identifying a trace event entry having a local sequence identifier and referencing a remote processor;
    accessing a remote event trace associated with the remote processor and having a remote trace event entry matching the local sequence identifier;
    comparing the remote trace event entry with the local sequence identifier and one or more local trace events in the local event trace; and
    inserting the remote trace event entry into the local event trace based upon the comparison.

11. The method of claim 10 wherein the local processor is used to process storage controller commands used in controlling a storage area network (SAN).

12. The method of claim 10 wherein the local sequence identifier corresponds to a semaphore associated with the local processor.

13. The method of claim 10 wherein the local processor and remote processor correspond to micromachines contained on single chip.

14. The method of claim 10 wherein the local processor and remote processor corresponds to multiple threads on a multithreaded processor.

15. The method of claim 10 wherein the local processor and remote processor correspond to separate processors each having separate sequence identifiers for ordering trace events.

16. A means for tracing events in a distributed processing environment, comprising:
    means for receiving a request to trace an event on a local processor;
    means for acquiring a sequence identifier associated with the local processor and capable of associating the event with a chronological sequence of events on the local processor;
    means for storing the sequence identifier and information about the event in a local event trace associated with the local processor; and
    means for providing the sequence identifier and information about the event to a remote processor for storage in a remote event trace.

17. A means for consolidating event traces from two or more processors into a single event trace providing a chronological order to a combined trace events, comprising:
    means for accessing a local event trace having one or more local trace events associated with the local processor;
    means for identifying a trace event entry having a local sequence identifier and referencing a remote processor;
    means for accessing a remote event trace associated with the remote processor and having a remote trace event entry matching the local sequence identifier;
    means for comparing the remote trace event entry with the local sequence identifier and one or more local trace events in the local event trace; and
    means for inserting the remote trace event entry into the local event trace based upon the comparison.

* * * * *